United States Patent [19]

Geist et al.

[11] Patent Number: 4,818,356
[45] Date of Patent: Apr. 4, 1989

[54] PROCESS FOR MULTICOAT CATHODIC WET-ON-WET PAINTING OF METALLIC CONDUCTIVE SUBSTRATES

[75] Inventors: Michael Geist; Günther Ott, both of Münster; Georg Schön, Everswinkel; Arnold Dobbelstein; Wolfgang Batzill, both of Münster, all of Fed. Rep. of Germany

[73] Assignee: BASF Lacke & Farben Aktiengesellschaft, Münster, Fed. Rep. of Germany

[21] Appl. No.: 905,333
[22] PCT Filed: Dec. 11, 1985
[86] PCT No.: PCT/EP85/00694
§ 371 Date: Sep. 25, 1986
§ 102(e) Date: Sep. 25, 1986
[87] PCT Pub. No.: WO86/03791
PCT Pub. Date: Jul. 3, 1986

[30] Foreign Application Priority Data

Dec. 22, 1984 [DE] Fed. Rep. of Germany ....... 3447257

[51] Int. Cl.$^4$ .............................................. C25D 13/06
[52] U.S. Cl. ................ 204/181.1; 204/181.7; 523/404; 523/412; 523/413; 523/415; 523/417; 524/901
[58] Field of Search ............ 204/181.1, 181.7; 523/403, 406, 412, 413, 415, 417, 418, 404

[56] References Cited

U.S. PATENT DOCUMENTS

| | | | |
|---|---|---|---|
| 4,175,018 | 11/1979 | Gacesa | 204/181.1 |
| 4,259,163 | 3/1981 | Suzuki | 204/181.1 |
| 4,310,398 | 1/1982 | Gimpel et al. | 204/181.7 |
| 4,375,498 | 3/1983 | Le Minez et al. | 204/181.1 |
| 4,404,332 | 9/1983 | Parekh et al. | 204/181.7 |
| 4,430,462 | 2/1984 | Jaeger et al. | 204/181.7 |
| 4,456,507 | 6/1984 | Kivel et al. | 204/181.1 |
| 4,500,399 | 2/1985 | Hart et al. | 204/181.1 |
| 4,536,558 | 8/1985 | Kordomenos | 204/181.7 |
| 4,557,976 | 12/1985 | Geist et al. | 204/181.7 |
| 4,595,717 | 6/1986 | Patzschke | 523/414 |

FOREIGN PATENT DOCUMENTS

| | | | |
|---|---|---|---|
| 0102566 | 3/1984 | European Pat. Off. | |
| 0057239 | 5/1977 | Japan | 204/181.1 |
| 0011174 | 1/1980 | Japan | 204/181.1 |
| 7309356 | 3/1973 | United Kingdom | 204/181.1 |

Primary Examiner—John F. Niebling
Assistant Examiner—Ben C. Hsing
Attorney, Agent, or Firm—Kenyon & Kenyon

[57] ABSTRACT

The invention relates to a process for coating an electrically conductive substrate, the said substrate being immersed in an aqueous bath based on a cationic synthetic resin binder which is at least in part neutralized with acids and contains amino and/or hydroxyl groups. The said bath contains a mixture of crosslinking agents as well as pigments, fillers, corrosion inhibitors, paint auxiliary substances, and, if appropriate, catalysts, as well as organic solvents in an amount of up to 15% by weight based on the total weight of the coating, the said substrate being cathodically connected. By the action of direct current, a film is deposited on the substrate, after which the said substrate is removed from the bath and the film is cured by stoving, the mixture of crosslinking agents comprising at least two crosslinking agents of different reactivities based on activated esters and/or polyisocyanates blocked by different blocking agents. The expression "different reactivities" means that the crosslinking reaction commences by heating to temperatures which are separated by at least 10° C. and that crosslinking agent which is first to react is present in an amount of 15 to 60 mol %, based on the mixture of the crosslinking agents. This first coat is rinsed and one or more further cathodic coats are deposited before stoving. After each coat has been rinsed, all the coats are cured together.

14 Claims, No Drawings

PROCESS FOR MULTICOAT CATHODIC WET-ON-WET PAINTING OF METALLIC CONDUCTIVE SUBSTRATES

BACKGROUND OF THE INVENTION

U.S, patent application Ser. No. 878,835, filed Apr. 10, 1986, the subject matter of which is incorporated herein by reference relates inter alia, to a process for coating an electrically conductive substrate, the said substrate being immersed in an aqueous bath based on a cationic synthetic resin binder which is at least in part neutralized with acids and contains amino and/or hydroxyl groups. The said bath contains a mixture of crosslinking agents as well as pigments, fillers, corrosion inhibitors, paint auxiliary substances and, if appropriate, catalysts, as well as organic solvents in an amount of up to 15% by weight of the total weight of the coating, the said substrate being cathodically connected. By the action of direct current, a film is deposited on the substrate, after which the said substrate is removed from the bath and the film is cured by stoving, the mixture of crosslinking agents comprising at least two crosslinking agents of different reactivities based on activated esters and/or polyisocyanates blocked by different blocking agents. The expression "different reactivities" means that the crosslinking reaction commences by heating to temperatures which are separated by at least 10° C. and that crosslinking agent which is first to react is present in an amount of 15 to 60 mol % based on the mixture of the crosslinking agents.

From the start of the electrocoating phase attempts have been made to automate the total painting process. As early as in the '60s, British Pat. No. 1,081,767 described the electrophoretic wet-on-wet painting process. The resins used, for example styrene-butadiene copolymers, failed, however, to produce a paint system with acceptable properties. The voltages reached were of a maximum of 100 V, and consequently insufficient throwing power was possible for the coating of cavities. With the cathodic paint systems available nowadays the outlook is far better. These systems also offer in general the possibility of cathodic multicoat wet-on-wet painting. In a two-coat painting system, consisting of a cathodically applied primer and a cathodically applied top coat, the surface quality which can be attained is, however, highly inadequate.

Consequently there is a need for a process for multicoat cathodic wet-on-wet painting of metallic substrates which would lead to coatings of good surface quality.

In a further embodiment of the main patent it has now been found that a coating system with a good surface quality can be obtained by the process described at the outset, which is characterized in that the first coat is rinsed, one or more further cathodic coats are deposited before stoving and all the coats are cured together after each coat had been rinsed.

The main patent describes in detail methods for measuring the start of the crosslinking reactions. As is also stated there, the increase is viscosity can be defined as the start of the crosslinking reaction.

SUMMARY OF THE INVENTION

In the process according to the invention, epoxy resins are particularly suitable as binders for the first coat on account of the good corrosion protection imparted by them, as is described for example in German Pat. No. 3,108,073, U.S. Pat. Nos. 4,104,147; 4,332,711; 4,352,842; 4,397,990; 4,401,774 and 4,405,763 and in the main patent. For the purpose of introducing the solubilizing groups, the binder resins are preponderantly modified by amines. Modification by ketimines has also proven particularly successful. Besides other methods not here more closely described, free primary amino groups can be introduced in this manner into the resin after dispersing the resin in water. Because of the conditions of the synthesis, the epoxy resins contain further free hydroxyl groups. Accordingly hydroxyl and frequently also amino groups become available in the binders for cross-linking with the added extraneous cross-linking agent. The crosslinking agents occurring in the binder are reactive with amino and hydroxyl groups.

A suitable crosslinking mixture consists for example of blocked polyisocyanates, as described in detail in German Auslegeschrift No. 2,057,799 and in the main patent.

In the process according to the invention, the polyisocyanate-blocking agents used are alcohols and/or amines. Reaction of the polyisocyanates with the blocking agents gives rise to urethane or urea groups which under the stoving conditions used can in turn give up the blocking agent and react with reactive groups in the binder, crosslinking taking place. Crosslinking agents which effect the crosslinking by transesterification or amidation comprise a further group of reactive crosslinking agents. The reactive ester group in the acid or alcohol moiety can be activated to this purpose. Examples of esters activated in the alcohol moiety are $\beta$-hydroxyalkyl ester, $\beta,\gamma$-dihydroxyalkyl ester, $\beta$-alkoxyalkyl ester and/or carbalkoxymethyl ester. The mixture of crosslinking agents can consist also of blocked polyisocyanates and of crosslinking agents with activated ester groups.

In the stoving process, the crosslinking agents react stepwise because of their different reactivities, i.e. at different times and different stoving temperatures. The temperatures at which the crosslinking reaction of the differently reactive crosslinking agents sets in are separated by at least 10° C. A good rate of crosslinking is provided by the crosslinking agent, of the first coat, which reacts first, before shrinking of the total system could occur because of the surface irregularities of the metallic substrate. The crosslinking agent which subsequently becomes active brings about a final crosslinking of the first coat.

Acrylate resins form suitabLe binders of the coating applied as second coat, as described for example in German Offenlegungsschrift No. 3,017,603 and U.S. Pat. Nos. 4,304,703 and 3,953,391. In the last-named patent, for example, acrylate resins containing carboxyl groups and modified by alkylenimines are used as binders for a cathodically applied coating. According to U.S. Pat. No. 4,339,256, the paint binders used for cathodic electrocoating of metallic substrates are based on tertiary amino groups, masked isocyanate groups, and copolymers containing hydroxyl and ether groups. Acrylate resins are preferred, since the coatings applied onto the first coat must in the main be decorative and because they are directly exposed to weathering and the action of light. It is furthermore possible that the coatings applied on top of the first coat contain the same binders as the first coat, i.e. extraneous crosslinking binders containing mixtures of crosslinking agents.

The first coat and those applied subsequently can be distinguished by their pigmentation.

A coat that can be cathodically deposited and contains metal powder can be applied cathodically wet-on-wet onto the first cathodic coat, as described in European Pat. No. 33,465. According to this patent, a synthetic resin coat containing a metal powder is produced by cataphoretic deposition of metal powder jointly with a cationic film former from an aqueous electrocoating paint containing the metal powder and the film former in protonized form. The film former may consist, for example, from an addition product of a primary or secondary amine with a resin containing epoxy groups.

A top coat which has not been applied by the electrocoating process may be applied after stoving to the cathodically deposited coatings. This coating can take place from an organic or aqueous solution. This top coat can be either a clear varnish or a pigmented paint.

Other paints that can be considered for the top coat are those in which film formation occurs from powders. Suitable binders for the coating powder are thermoplastic or thermosetting higher or high molecular substances, for example those selected from the classes of epoxides, polyesters, polyacrylates, polyurethanes, polyamides and also cellulose acetobutyrate and polypropylene. Coating materials based on epoxides are particularly versatile because of their formulation flexibility. The application of the powder takes place by electrostatic spraying or by whirl sintering.

Top coating can also be achieved by applying a coating of a solids content of more than 50% by weight.

DESCRIPTION OF THE PREFERRED EMBODIMENTS

The present invention is further illustrated by examples in what follows. All parts and percentages are quoted by weight, unless expressly stated otherwise.

(a) Preparation of the crosslinking agents

Preparation of the crosslinking agent I

A reaction vessel provided with a heating jacket, a condenser, a stirrer, a thermometer, an outlet that leads to a washing device, and a nitrogen inlet, is charged with 12,280 parts of toluylenediisocyanate (a mixture of about 80% of 2,4-toluylenediisocyanate and about 20% of 2,6-toluylenediisocyanate). Nitrogen is introduced and the condenser is connected. 5,550.5 parts of 2-ethylhexanol are gradually added during the course of 5 hours, with the temperature gradually rising to 50° C. A further 3,649.5 parts of 2-ethylhexanol are added during the course of 4 hours, the temperature being maintained at 50° C. The reaction mixture is maintained for 75 minutesaat 50° C., the condenser is then disconnected and 3.6 parts of dibutyltin dilaurate are added. The heating jacket is switched on and the reaction mixture is warmed to 65.6° C. during the course of 45 minutes. 3,184 parts of 1,1,1-trimethylolpropane are added during the course of 2 hours and 50 minutes, the temperature rising from 65.6 to 120° C. The reaction mixture is kept at this temperature for 90 minutes, and 10,560 parts of 2-ethoxyethanol are then added. The resultant product is a solution of a polyurethane crosslinking agent. The minimum stoving temperature of this crosslinking agent is 165° C.

Preparation of crosslinking agent II

In a reaction vessel, 2,340 g of the glycidyl ester of 2-methyl-2-ethylheptanoic acid are heated at 130° C. with 2,073 g of trimellitic anhydride. A strongly exothermic reaction takes place. The reaction is maintained at 150° C. by external cooling, until an acid number of 183 is reached. The mixture is then cooled to 90° C. and treated with 1,450 g of methyl isobutyl ketone. Subsequently 835 g of propylene oxide are slowly added dropwise. The reaction is interrupted when an acid number of 2 is reached. The solids content of the resin solution is adjusted to 70% by the addition of more methyl isobutyl ketone. The minimum stoving temperature of this crosslinking agent is 180° C.

Preparation of crosslinking agent III 2,599 parts of a 75% solution of a trimerized hexamethylenediisocyanate in ethylglycol acetate-xylene are introduced in a suitable reaction vessel under nitrogen.

1,290 parts of dibutylamine are added dropwise over 6 hours. The temperature is kept below 45° C. The reaction mixture is then cooled to room temperature and the solution of the crosslinking agent is filtered. The minimum stoving temperature of this crosslinking agent is 140° C.

Preparation of crosslinking agent IV 2,123 parts of a polyfunctional aliphatic isocyanate based on hexamethylenediisocyanate are introduced in a suitable reaction vessel under nitrogen. 1,076 parts of methyl ethyl ketoxime are run in during 5 hours, the temperature being maintained at 70° C. The mixture is then warmed for a short time to 100° C. in order to complete the reaction, 800 parts of ethylglycol are added with stirring and the solution of the crosslinking agent is cooled to room temperature.

(b) Preparation of the binders

Preparation of binder I

The binder is prepared by analogy with Example A of EP-A No. 70 550.

1,019 parts of a commercially available epoxy resin based on bisphenol A (epoxy equivalent weight 485), 39 parts of xylene and 265 parts of a polycaprolactone polyol with a mean molecular weight of 540 are introduced in a suitable reaction vessel. The mixture is heated under reflux and maintained at this temperature for 30 minutes. It is then cooled to 140° C. and treated with 3.85 parts of dimethylbenzylamine. The reaction mixture is then kept at 130° C. for 2.5 hours. Subsequently 802 parts of the crosslinking agent I are added. The reaction mixture is thereby cooled to 110° C.; 64 parts of methylethanolamine and 40 parts of a 70% solution of methylisobutyldiketimine of diethylenetriamine are added. The ketimine is obtained from one mole of diethylenetriamine and 2 moles of methyl isobutyl ketone. The preparation is described in U.S. Pat. No. 3,523,925. The reaction mixture is maintained at 115° C. for 1 hour. It is then diluted with 104 parts of hexylglycol and maintained for a further hour at 115° C. It is then cooled to 100° C. and treated with 201 parts of crosslinking agent II and 15 parts of lead octoate with 15 minutes stirring. Subsequently, in another reaction vessel, 2,350 parts of the charge are dispersed with 3,015 parts of deionized water, 24.7 parts of glacial acetic acid and 48.3 parts of an emulsifier solution.

Preparation of binder II 1,024 parts of a commercially available epoxy resin based on bisphenol A (epoxy equivalent weight 188), 142 parts of neopentylglycol and 40 parts of xylene are introduced in a suitable reaction vessel and heated to 120° C. 4.1 parts of dimethylbenzylamine are added and the temperature is allowed to rise to 130° C. This temperature is maintained until an epoxy equivalent weight of 425 is reached, and 366 parts of the polycaprolactone polyol already mentioned above and 3.1 parts of dimethylbenzylamine are added. The temperature is maintained at 130° C. until an epoxy equivalent weight of 1,085 is reached. 971 parts of the crosslinking agent I are then added, followed by 107 parts of the abovementioned ketimine and 80 parts of methylethanolamine. The temperature will rise again thereby. It is kept for one hour at 115° C., 76 parts of phenoxypropanol and 38 parts of ethylglycol are added and the mixture is stirred for 15 minutes. 2,290 parts of the resin solution are mixed with 210 parts of the crosslinking agent III prior to dispersion. This mixture is subsequently dispersed in 3,439 parts of deionized water, 39 parts of glacial acetic acid and 23 parts of an emulsifier solution.

Preparation of binder III 992 parts of an epoxy resin based on bisphenol A with an epoxy equivalent weight of 495 and 1,814 parts of an epoxy resin based on bisphenol A with an epoxy equivalent weight of 910 are introduced in a suitable reaction vessel with 864 parts of methyl isobutyl ketone and the mixture is heated. At 117° C. the vessel is connected to vacuum and water is removed by distillation. The mixture is subsequently cooled to 70° C. and treated dropwise with 210 parts of diethanolamine, the temperature rising to 80° C. The temperature is maintained for 6 hours and 630 parts of a reaction product of one mole of hexamethylenediamine with 2 moles of the glycidyl ester of 2-methyl-2-ethylheptanoic acid are added. The reaction mixture is then warmed to 120° C. and the reaction is allowed to proceed for a further 7 hours. 141 parts of hexylglycol and 446 parts of xylene are then mixed in. 1,854 parts of this resin solution are treated with 452 parts of the crosslinking agent II, 194 parts of the crosslinking agent III and 60 parts of lead octoate, and the mixture is subsequently dispersed in 3,220 parts of deionized water and 35 parts of glacial acetic acid.

Preparation of binder IV

The following mixture is introduced in a suitable reaction vessel under nitrogen: 260 parts of phenylglycol, 15 parts of water, 4 parts of tert.-butyl peroctoate, 40 parts of methyl methacrylate, 37 parts of butyl acrylate, 40 parts of styrene, 27 parts of hydroxyethyl methacrylate and 7 parts of dodecylmercaptan. This mixture is heated to 105° C.; from separate supply vessels, the following 2 mixtures are then run in:

Mixture 1: 210 parts of phenylglycol and 40 parts of tert.-butyl peroctoate;

Mixture 2: 350 parts of methyl methacrylate, 330 parts of butyl acrylate, 350 parts of styrene, 240 parts of hydroxyethyl methacrylate and 65 parts of dodecylmercaptan.

The temperature is allowed to rise slowly to 130° C. during the addition. When the addition is complete, this temperature is maintained for one hour, and further quantities of 25 parts of phenylglycol and 1 part of tert.butyl peroctoate are added during 90 minutes. 60 parts of deionized water are then rapidly added, the water being again removed with residual monomers in the next hour. The mixture is cooled to 100° C. and treated with 100 parts of N-methylethanolamine. This causes the temperature to rise to 110° C. This temperature is maintained for one hour, after which 250 parts of the crosslinking agent IV are added and the mixture stirred for 30 minutes. The resin solution is subsequently dispersed in 80 parts of glacial acetic acid and 4,000 parts of deionized water.

Preparation of binder V

The following mixture is introduced in a suitable reaction vessel in a protective atmosphere and heated to 120° C.: 60 parts of N-methylpyrrolidone, 6 parts of deionized water, 1.5 parts of tert.-butyl peroctoate, 14 parts of butyl acrylate, 14 parts of styrene, 4 parts of hydroxyethyl methacrylate, 1 part of methyl methacrylate, 6 parts of glycidyl methacrylate and 2.5 parts of dodecylmercaptan. As soon as the temperature has reached 120° C., 15 parts of tert.-butyl peroctoate in 30 parts of N-methylpyrrolidone and the following mixture of monomers are added separately: 140 parts of butyl acrylate, 140 parts of styrene, 40 parts of hydroxyethyl methacrylate, 10 parts of methyl methacrylate, 60 parts of glycidyl methacrylate and 25 parts of dodecylmercaptan. During the addition the temperature is slowly raised to 125° C. This temperature is maintained for 2 hours and 1 part of tert.-butyl peroctoate in 20 parts of N-methylpyrrolidone is added during a further hour. A rapid addition of 20 parts of deionized water follows, the water again being distilled off in order to remove residual monomers. To this purpose the mixture is heated to 130° C. When all of the water is separated off, the reaction mixture is cooled to 90° C. and treated with 30 parts of N-methylethanolamine. Owing to the exothermic reaction, the temperature rises again, and is then maintained at 115° C. for one hour. The mixture is cooled to 90° C. and treated with 40 parts of 90% lactic acid. The addition of N-methylpyrrolidone gives rise to a solids content of 60%.

Preparation of binder VI 1,350 parts of xylene are introduced in a reaction vessel suitable for acrylate polymerization and heated to 130° C. As soon as this temperature is reached, a monomer mixture consisting of 1,250 parts of n-butyl methacrylate, 360 parts of 2-hydroxyethyl methacrylate, 410 parts of 2-ethylhexyl methacrylate, 60 parts of methacrylic acid and 45 parts of $\alpha,\alpha'$-azobisisobutyronitrile is added during 3.5 hours. The mixture is maintained for a further 30 minutes at 130° C. Subsequently, 200 parts of xylene and 20 parts of $\alpha,\alpha'$-azobisisobutyronitrile are added in portions during 2 hours at 130° C. Subsequent polymerization reaction then takes place at this temperature during 2 hours, followed by an addition of a further 60 parts of xylene and 300 parts of n-butanol.

(c) Preparation of a gray pigment paste 800 parts of butylglycol are added to 953 parts of a commercially available epoxy resin based on bisphenol A with an epoxy equivalent weight of 8%. The mixture is heated to 80° C. 221 parts of a reaction product of 101 parts of diethanolamine and 120 parts of 80% aqueous lactic acid are then added to this resin solution. The reaction is allowed to proceed at 80° C. until the acid number drops below 1.

1,800 parts of this product are treated with 2,447 parts of deionized water, followed by 2,460 parts of titanium dioxide, 590 parts of an extender based on aluminum silicate, 135 parts of lead silicate and 37 parts of carbon black. This mixture is comminuted by grinding to a Hegman fineness of 5-7. 1,255 parts of deionized water are added in order to obtain a paste of desired consistency. This gray paste is highly stable on storage.

(d) Preparation of a green pigment paste 180 parts of the binder V are well mixed with 360 parts of water and 18 parts of an antifoam. 30 parts of a green pigment based on polychlorinated phthalocyanin copper complex, 150 parts of permanent yellow (Color Index No. 11,783), 25 parts of titanium dioxide and 500 parts of chromium oxide green (Color Index No. 77,288) are added. This mixture is then ground to the desired fineness.

(e) Preparation of the electrocoating baths

1. Baths for first coating (priming)

2,000 parts of each of the binders I, II and III described above are mixed with 775 parts of the gray pigment paste. The bath solids are adjusted with deionized water to 20% (150° C., 30 minutes). The baths are allowed to age for 3 days with stirring. The baths will be designated bath I, bath II and bath III according to the binder used.

2 Baths for further coatings

Bath IV

1,500 parts of deionized water are mixed with 2,000 parts of the binder IV and 70 parts of the green paste. The bath solids are adjusted to 15% with additional water (150° C., 30 minutes). The bath is allowed to age for 3 days with stirring prior to first application.

Bath V

A bath for clear varnish was prepared from the binder IV in such a way that the binder dispersion is diluted with deionized water to a solids content of 22% (150° C., 30 minutes). The bath should be allowed to age with stirring for at least one day prior to the first application.

Bath VI

Firstly, 150 parts of a 60% aluminum paste are mixed into 200 parts of the binder V. 20 parts of a catalyst paste are then added. This paste is prepared from 33 parts of dibutyltin oxide, 24 parts of the binder V and 43 parts of deionized water. The bath is further treated with 2,500 parts of the binder IV and diluted to 5,000 parts with deionized water.

(f) Deposition of the baths

The deposition of the paint films takes place onto zinc-phosphated metal sheets. Each of 5 sheets is coated with the gray primers (baths I, II and III) under the described conditions. The bath temperature is 27° C. in each case, and the time of deposition is 2 minutes. One of each of the coated sheets is then separately stoved at 180° C. for 15 minutes.

|  | Ex. 1 (Bath I) | Ex. 2 (Bath II) | Ex. 3 (Bath III) |
| --- | --- | --- | --- |
| Application voltage | 360 V | 315 V | 320 V |
| Thickness of layer | 18 μm | 34 μm | 21 μm |

The metal sheets that have not been stoved are rinsed with water and exposed to air for 10 minutes. The sheets are then subjected to a second cathodic deposition in bath IV. The application time is 3 minutes, the bath temperature is 30° C. The deposition voltage is 340 V. The sheets are subsequently rinsed with water and blown dry. One of each of the sheets is then stoved at 180° C. for 20 minutes.

|  | Ex. 4 (Baths I + IV) | Ex. 5 (Baths II + IV) | Ex. 6 (Baths III + IV) |
| --- | --- | --- | --- |
| Thickness of layer | 53 μm | 74 μm | 61 μm |
| Progress* | 1 | 0.5 | 1 |
| DOI** | 85 | 93 | 78 |

*0 = best; 5 = worst
**DOI = distinctness of reflected image

For this measurement, the primed sheets are coated with 50 μm of an acrylate topcoat paint.

The DOI value is obtained by a relative measurement: it is a measure of the gloss characteristics of an almost ideal mirror-like reflecting surface. In the measurement, the value obtained at reflection maximum, i.e. when the angle of incidence of a light ray equals the angle of reflection, is set in relation to the value obtained when the angles differ by 0.3°.

The doubly cathodically coated metal sheets, which have not been stoved, are exposed to air for 10 minutes after being rinsed and subsequently coated in bath V by a third cathodic coating. The bath temperature is about 30° C., the coating takes 2 minutes with 340 V. One of each of the sheets is rinsed with water, blown dry and stoved for 20 minutes at 180° C.

|  | Ex. 7 (Baths I + IV + V) | Ex. 8 (Baths II + IV + V) | Ex. 9 (Baths III + IV + V) |
| --- | --- | --- | --- |
| Thickness of layer | 71 μm | 95 μm | 80 μm |
| Progress* | 0.5 | 0 | 0.5 |
| DOI** | 89 | 95 | 83 |

*0 = best, 5 = worst
**DOI = distinctness of reflected image

The metal sheets that had been coated cathodically in a simple way in tests 1, 2 and 3, are cathodically coated in bath VI with the silver metallic paint. The application time is 3 minutes with a bath temperature of 27° C. The deposition voltage is approximately 280 V. After coating, the sheets are rinsed with water and blown dry. Subsequently the sheets are stoved for 20 minutes at 180° C.

|  | Ex. 10 (Baths I + VI) | Ex. 11 (Baths II + VI) | Ex. 12 (Baths III + VI) |
| --- | --- | --- | --- |
| Thickness of layer | 57 μm | 78 μm | 64 μm |

The sheets from Examples 4, 5, 6, 10, 11 and 12 are sprayed with a clear varnish described in the following.

Preparation of an organically dissolved clear varnish:

The clear varnish is prepared from the following components:

1,805 parts of binder VI, 693 parts of a 55% solution of a melamine resin in isobutanol, 2 parts of silicone oil*.

* Silicone oil, diluted with xylene to 1 percent by weight.

The charge is diluted with xylene to a viscosity of 30 seconds (Ford cup 4/20° C.).

The pretreated metal sheets are then sprayed with the clear varnish, so that a dry film thickness of about 35 μm of a clear varnish film is obtained. The top coat is stoved at 130° C. for 30 minutes.

Result of coating with the clear varnish as the top coat:

The Examples 13–18 refer in this series to the sheets from the Examples 4, 5, 6, 10, 11 and 12, coated with clear varnish.

|  | Ex. 13 | Ex. 14 | Ex. 15 | Ex. 16 | Ex. 17 | Ex. 18 |
|---|---|---|---|---|---|---|
| Total thickness of layer (μm) | 91 | 112 | 97 | 89 | 115 | 98 |
| Pencil hardness[1] | 2H | H | H | 2H | H | H |
| Erichsen deep-drawing value (mm)[2] | 3.8 | 5.1 | 4.3 | 4.3 | 5.6 | 4.5 |
| DOI[3] | 89 | 94 | 91 | 87 | 95 | 93 |

[1]The films are scratched with pencils of various hardnesses at 20° C. and 75% relative humdiity. The maximum pencil hardness that fails to damage the film is determined.
[2]Erichsen indentation according to DIN 53 156
[3]Distinctness of reflected image

We claim:

1. A process for coating an electrical conductive substrate, which comprises:
    immersing the substrate in a first acidic aqueous bath comprising a first cationic synthetic resin binder having amino groups or a mixture of amino groups and hydroxyl groups, a first cross-liner mixture of a pair of crosslinking agents, and additive agents selected from the group consisting of a pigment, a filler, a corrosion inhibitor, a surface coating additive, a catalyst and an organic solvent in an amount of up to 15% by weight, based upon the total weight of said first bath ingredients excluding water and acid,
    making the substrate the cathode for electrodeposition,
    depositing a first coat on the substrate by means of direct current to produce a sigle coated substrate,
    removing the single coated substrate form the bath and rinsing it,
    immersing the single coated substrate in a second acidic aqueous bath comprising a second cationic synthetic resin binder having amino groups or a mixture of amino groups and hydroxyl groups, a second cross-linker mixture of a pair of crosslinking agents, and additive agents selected from the group consisting of a pigment, a filler, a corrosion inhibitor, a surface coating additive, a catalyst and an organic solvent in an amount of up to 15% by weight based upon the total weight of said second bath ingredients excluding water and acid,
    making the single coated substrate the cathode for electrodeposition,
    depositing a second coat on the single coated substrate by means of direct current to produce a double coated substrate,
    removing the double coated substrate from the bath and rinsing it, and
    curing the double coated substrate;
    said pairs of crosslinking agents of the first and second cross-linker mixtures each being (a) a pair of carboxylic esters having the differing activated alcohol residual moieties wherein the alkyl group thereof has a substituent selected from the group consisting of beta ester, beta-alkyl ether, beta, gammadihydroxy, and beta hydroxy, (b) a pair of polyisocyanates blocked with different blocking agents, or (c) a combination of said carboxylic ester and said blocked polyisocyanate, each pair of crosslinking agents having different reactivities such that their crosslinking reactions are initiated at temperature which are at least 10° C. apart and the crosslinking agent which reacts first is present in an amount of from 15 to 60 mol %, based upon the mixture of the crosslinking agents.

2. A process according to claim 1 wherein the pairs of crosslinking agents are polyisocyanates blocked by amines or alcohols selected so that the crosslinking reactions of the pairs of blocked polyisocyanates are initiated at temperatures which are at least 10° C. apart.

3. A process according to claim 2 wherein the blocking agents are amines.

4. A process according to claim 2 wherein the blocking agents are alcohols.

5. A process according to claim 1 wherein the pairs of crosslinking agents are carboxylic esters having an activated alcohol residual moiety.

6. A process according to claim 1 wherein the pairs of crosslinking agents are a combination of a carboxylic esters having an activated alcohol residual moiety and a blocked polyisocyanate.

7. A process according to claim 1 wherein the second cationic synthetic resin is an acrylate resin containing amine groups.

8. A process according to claim 1 wherein the first cationic synthetic resin is an aminie-epoxy resin adduct.

9. A process according to claim 1 wherein the pigment in the first aqueous acidic bath includes metal powder.

10. A process according to claim 1 further comprising applying a top coat to the cured, double coated substrate by a non-electrodepoit means.

11. A process according to claim 10 wherein the top coat is applied as an organic or aqueous solution.

12. A process according to claim 10 wherein the top coat is a powder paint.

13. A process according to claim 10 wherein the top coat has a solids content of greater than 50% by weight.

14. A process according to claim 11 further comprising repeatedly immersing the uncured double coated substrate into the second acidic aqueous bath and electrodepositing further coats thereon, and rinsing before curing the multiply coated substrate, so produced.

* * * * *

UNITED STATES PATENT AND TRADEMARK OFFICE
CERTIFICATE OF CORRECTION

PATENT NO. : 4,818,356

DATED : April 4, 1989

INVENTOR(S) : Michael Geist et al

It is certified that error appears in the above-identified patent and that said Letters Patent is hereby corrected as shown below:

In Column 2, line 50, change "resin form suitabLe..." to read --resin form suitable---

In Column 2, line 57, change "U.S. Patent No. 4,339,256..." to read --U.S. Patent No. 4,399,256...--

In Column 3, line 53, change "...minutesaat..." to read --...minutes at...--

In Column 6, line 49, change "...2-hydroxyethyi..." to read --...2-hydroxyethyl...--

In Column 8, line 68, delete "wing."

In Column 9, line 39, change "...cross-liner mixture..." --...cross-linker mixture...-- line 51, change "...substrate form..." to read --...substrate from...--

UNITED STATES PATENT AND TRADEMARK OFFICE
CERTIFICATE OF CORRECTION

PATENT NO. : 4,818,356
DATED : APRIL 4, 1989
INVENTOR(S) : MICHAEL GEIST ET AL

It is certified that error appears in the above-identified patent and that said Letters Patent is hereby corrected as shown below:

In Column 10, line 11, change "...having the differing..." to read --having differing...-- line 21, change "...temperature..." to read --...temperatures...-- line 51, change "...non-elertrodepoit..." to read --...non-electrodeposit...--

In Column 10, line 58, change, "...claim 11..." to read --...claim 1...--

Signed and Sealed this

Twenty-fourth Day of April, 1990

Attest:

HARRY F. MANBECK, JR.

*Attesting Officer*

*Commissioner of Patents and Trademarks*